US009389415B2

(12) United States Patent
Fattal et al.

(10) Patent No.: US 9,389,415 B2
(45) Date of Patent: Jul. 12, 2016

(54) DIRECTIONAL PIXEL FOR USE IN A DISPLAY SCREEN (71) Applicant: LEIA INC., Menlo Park, CA (US)

(72) Inventors: David A. Fattal, Mountain View, CA (US); James A. Brug, Menlo Park, CA (US); Zhen Peng, Foster City, CA (US); Marco Fiorentino, Mountain View, CA (US); Raymond G. Beausoleil, Seattle, WA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 14/309,601

(22) Filed: Jun. 19, 2014

(65) Prior Publication Data

US 2014/0300947 A1 Oct. 9, 2014

Related U.S. Application Data (63) Continuation of application No. PCT/US2012/035573, filed on Apr. 27, 2012.

(51) Int. Cl.
G02B 26/08 (2006.01)
G02F 1/29 (2006.01)
G02B 26/00 (2006.01)

(52) U.S. Cl.
CPC ................... G02B 26/0808 (2013.01)

(58) Field of Classification Search
CPC ..................................................... G02B 27/22
USPC .......... 359/290, 291, 292, 295, 298, 237, 242
See application file for complete search history.

(56) References Cited

U.S. PATENT DOCUMENTS

| 5,184,848 A | 2/1993 | Itoh et al. |
| 5,301,062 A | 4/1994 | Takahashi et al. |
| 5,615,024 A | 3/1997 | May et al. |
| 5,617,248 A | 4/1997 | Takahashi et al. |
| 5,721,598 A | 2/1998 | Smith |
| 5,729,311 A | 3/1998 | Broer et al. |
| 5,926,294 A | 7/1999 | Sato et al. |
| 6,158,884 A | 12/2000 | Lebby et al. |

(Continued)

FOREIGN PATENT DOCUMENTS

| CN | 1213097 A | 4/1999 |
| CN | 1479878 A | 3/2004 |

(Continued)

OTHER PUBLICATIONS

International Search Report and Written Opinion (ISR/WO) of the International Searching Authority (ISA/KR) mail date Dec. 26, 2012 (6 pages) for counterpart PCT patent application No. PCT/US2012/035573.

(Continued)

Primary Examiner — Joseph P Martinez
Assistant Examiner — Brandi Thomas
(74) Attorney, Agent, or Firm — North Shore Associates; J. Michael Johnson (57) ABSTRACT A directional pixel for use in a display screen is disclosed. The directional pixel receives a planar lightbeam and includes a light propagating layer and a grating to scatter a portion of the planar lightbeam into a directional lightbeam having a direction and angular spread controlled by the grating.

23 Claims, 7 Drawing Sheets (56) References Cited

U.S. PATENT DOCUMENTS

| | | |
|---|---|---|
| 6,437,920 B1 | 8/2002 | Wohlstadter |
| 6,490,393 B1 | 12/2002 | Zhou |
| 6,580,529 B1 | 6/2003 | Amitai et al. |
| 6,667,819 B2 | 12/2003 | Nishikawa et al. |
| 6,718,093 B2 | 4/2004 | Zhou |
| 6,980,271 B2 | 12/2005 | Fujishiro |
| 7,044,628 B2 | 5/2006 | Choi et al. |
| 7,114,820 B1 | 10/2006 | Parikka et al. |
| 7,626,643 B2 | 12/2009 | Ijzerman et al. |
| 7,742,120 B2 | 6/2010 | Bayley et al. |
| 7,773,849 B2 | 8/2010 | Shani |
| 7,859,947 B2 | 12/2010 | Kawai |
| 7,903,332 B2 | 3/2011 | De Zwart et al. |
| 8,026,997 B2 | 9/2011 | Feng |
| 8,681,423 B1 | 3/2014 | Gibson et al. |
| 8,915,635 B2 | 12/2014 | Fiorentino et al. |
| 2002/0008834 A1 | 1/2002 | Suzuki |
| 2002/0075445 A1 | 6/2002 | Dabrowski et al. |
| 2003/0086649 A1 | 5/2003 | Zhou |
| 2004/0130879 A1 | 7/2004 | Choi et al. |
| 2004/0156182 A1 | 8/2004 | Hatjasalo et al. |
| 2004/0156589 A1 | 8/2004 | Gunn et al. |
| 2005/0041174 A1* | 2/2005 | Numata et al. .............. 349/61 |
| 2005/0073627 A1 | 4/2005 | Akiyama |
| 2005/0123229 A1 | 6/2005 | Huck et al. |
| 2005/0140832 A1* | 6/2005 | Goldman et al. .......... 348/746 |
| 2006/0083476 A1 | 4/2006 | Winkler |
| 2006/0104570 A1 | 5/2006 | Rausch |
| 2007/0129864 A1* | 6/2007 | Tanaka et al. .............. 701/36 |
| 2007/0213955 A1 | 9/2007 | Ishida et al. |
| 2007/0236801 A1 | 10/2007 | Cha et al. |
| 2007/0279367 A1 | 12/2007 | Kitai |
| 2007/0298533 A1* | 12/2007 | Yang et al. .................. 438/57 |
| 2008/0204663 A1 | 8/2008 | Balogh |
| 2008/0204873 A1 | 8/2008 | Daniell |
| 2008/0285307 A1 | 11/2008 | Aylward et al. |
| 2009/0016168 A1 | 1/2009 | Smith |
| 2009/0207342 A1 | 8/2009 | Yamaguchi et al. |
| 2009/0213300 A1 | 8/2009 | Daiku |
| 2009/0244706 A1 | 10/2009 | Levola et al. |
| 2009/0290837 A1 | 11/2009 | Chen et al. |
| 2009/0322986 A1 | 12/2009 | Wei et al. |
| 2010/0039832 A1 | 2/2010 | Ahlgren et al. |
| 2010/0103485 A1 | 4/2010 | Haussler |
| 2010/0118117 A1 | 5/2010 | Kroll et al. |
| 2010/0123952 A1 | 5/2010 | Chen et al. |
| 2010/0207964 A1 | 8/2010 | Kimmel et al. |
| 2010/0284085 A1 | 11/2010 | Laakkonen |
| 2010/0289870 A1 | 11/2010 | Leister |
| 2011/0002143 A1 | 1/2011 | Saarikko et al. |
| 2011/0141395 A1 | 6/2011 | Yashiro |
| 2011/0149596 A1 | 6/2011 | Lv et al. |
| 2011/0157667 A1 | 6/2011 | Lacoste et al. |
| 2011/0182570 A1 | 7/2011 | Yeh |
| 2011/0254916 A1 | 10/2011 | Fan et al. |
| 2011/0304784 A1 | 12/2011 | Hirota et al. |
| 2011/0308445 A1 | 12/2011 | Avda |
| 2012/0013962 A1 | 1/2012 | Subbaraman et al. |
| 2012/0075698 A1 | 3/2012 | Minami |
| 2012/0113678 A1* | 5/2012 | Cornelissen et al. ......... 362/607 |
| 2012/0120213 A1 | 5/2012 | Ohyama et al. |
| 2012/0127573 A1 | 5/2012 | Robinson et al. |
| 2012/0127751 A1 | 5/2012 | Kimmel et al. |
| 2012/0176665 A1 | 7/2012 | Song et al. |
| 2012/0249934 A1 | 10/2012 | Li et al. |
| 2012/0250141 A1 | 10/2012 | Chen |
| 2012/0281950 A1 | 11/2012 | Fattal et al. |
| 2013/0057539 A1 | 3/2013 | Kim |
| 2013/0082980 A1 | 4/2013 | Gruhlke et al. |
| 2013/0201723 A1 | 8/2013 | Gourlay |
| 2014/0111856 A1 | 4/2014 | Brug et al. |
| 2014/0293759 A1 | 10/2014 | Taff et al. |
| 2014/0300840 A1 | 10/2014 | Fattal et al. |
| 2014/0300960 A1 | 10/2014 | Santori et al. |
| 2015/0016777 A1 | 1/2015 | Abovitz et al. |
| 2015/0036068 A1 | 2/2015 | Fattal et al. |

FOREIGN PATENT DOCUMENTS

| | | |
|---|---|---|
| CN | 1517760 A | 8/2004 |
| CN | 202126538 | 1/2012 |
| JP | H08-190095 A | 7/1996 |
| JP | 11-326545 A | 11/1999 |
| JP | 2000267041 A | 9/2000 |
| JP | 2002031788 A | 1/2002 |
| JP | 2004302186 A | 10/2004 |
| JP | 2008164963 A | 7/2006 |
| JP | 2007033200 A | 2/2007 |
| JP | 2008083532 A | 4/2008 |
| JP | 2009053499 A | 3/2009 |
| JP | 2009288718 A | 12/2009 |
| JP | 2010102188 A | 5/2010 |
| JP | 2010237416 A | 10/2010 |
| JP | 2011029161 A | 2/2011 |
| JP | 2011133677 A | 7/2011 |
| JP | 2011170178 A | 9/2011 |
| JP | 2011232717 A | 11/2011 |
| JP | 2012022085 A | 2/2012 |
| WO | 9908257 A1 | 2/1999 |
| WO | 0242821 A1 | 5/2002 |
| WO | 2010119426 A2 | 10/2010 |
| WO | 2012069071 A1 | 5/2012 |
| WO | 2013180725 A1 | 12/2013 |
| WO | 2013180737 A1 | 12/2013 |
| WO | 2014120194 A1 | 8/2014 |
| WO | 2015016844 A1 | 2/2015 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Son et al., "Three-Dimensional Imaging Methods Based on Multiview Images," IEEE/OSA Journal of Display Technology, Sep. 2005, pp. 125-140, vol. 1, No. 1.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Fattal et al., "A multi-directional backlight for a wide-angle, glasses-free three-dimensional display," Nature, Mar. 21, 2013, pp. 348-351, vol. 495, Macmillan Publishers Limited, 2013.

International Search Report and Written Opinion (ISR/WO) of the International Searching Authority (ISA/KR) mail date Oct. 25, 2013 (9 pages) for counterpart PCT patent application No. PCT/US2013/024093 (WO2014120194A1).

International Search Report and Written Opinion (ISR/WO) of the International Searching Authority (ISA/KR) mail date Mar. 13, 2013 (8 pages) for counterpart PCT patent application No. PCT/US2012/040305 (WO2013180725A1).

International Search Report and Written Opinion (ISR/WO) of the International Searching Authority (ISA/KR) mail date Mar. 11, 2013 (8 pages) for counterpart PCT patent application No. PCT/US2012/040607 (WO2013180737).

International Search Report and Written Opinion (ISR/WO) of the International Searching Authority (ISA/KR) dated Apr. 29, 2014 (15 pages) for counterpart PCT patent application No. PCT/US2013/052774 (WO2015016844A1).

(56) References Cited

OTHER PUBLICATIONS

USPTO Non-final Office Action with mail date Sep. 23, 2014 for U.S. Appl. No. 14/308,961 (12 pages).
Response/Amendment filed Dec. 22, 2014 (25 pages) for U.S. Appl. No. 14/308,961 in response to non-final Office Action with mail date Sep. 23, 2014.
USPTO Notice of Allowance and Fee(s) Due & Notice of Allowability with mail date Apr. 17, 2015 for U.S. Appl. No. 14/308,689 (7 pages).
USPTO Non-final Office Action with mail date Jan. 30, 2015 for U.S. Appl. No. 14/309,532 (15 pages).
Response/Amendment filed Apr. 28, 2015 (19 pages) for U.S. Appl. No. 14/309,532 in response to non-final Office Action with mail date Jan. 30, 2015.
USPTO Non-final Office Action with mail date Dec. 4, 2014 for U.S. Appl. No. 14/309,005 (10 pages).
Response/Amendment filed Feb. 14, 2015 (17 pages) for U.S. Appl. No. 14/309,005 in response to non-final Office Action with mail date Dec. 4, 2014.
USPTO Non-final Office Action with mail date Oct. 16, 2014 for U.S. Appl. No. 14/308,689 (9 pages).
Response/Amendment filed Dec. 22, 2014 (18 pages) for U.S. Appl. No. 14/308,689 in response to non-final Office Action with mail date Oct. 16, 2014.
USPTO Non-final Office Action with mail date Apr. 24, 2015 for U.S. Appl. No. 14/308,961 (21 pages).
Extended (or Supplemental) European Search Report (EESR) dated Dec. 10, 2015 (8 pages) for European counterpart patent application No. 12875634.3 (PCT/2012/035573).

\* cited by examiner

DIRECTIONAL PIXEL FOR USE IN A DISPLAY SCREEN

CROSS-REFERENCE TO RELATED APPLICATIONS

This application is a continuation application of and claims the benefit of priority to prior International Application No. PCT/US2012/035573, filed Apr. 27, 2012, the entire contents of which is incorporated herein by reference.

STATEMENT REGARDING FEDERALLY SPONSORED RESEARCH OR DEVELOPMENT

N/A

BACKGROUND

The ability to reproduce a light field in a display screen has been a key quest in imaging and display technology. A light field is the set of all light rays traveling in every direction through every point in space. Any natural, real-world scene can be fully characterized by its light field, providing information on the intensity, color, and direction of all light rays passing through the scene. The goal is to enable viewers of a display screen to experience a scene as one would experience it in person.

Currently available display screens in televisions, personal computers, laptops, and mobile devices remain largely two-dimensional and are thus not capable of accurately reproducing a light field. Three-dimensional ("3D") displays have recently emerged but suffer from inefficiencies in angular and spatial resolution in addition to providing a limited number of views. Examples include 3D displays based on holographic gratings, parallax barriers, or lenticular lenses.

A common theme among these displays is the difficulty to fabricate displays with light fields that are controlled with precision at the pixel level in order to achieve good image quality for a wide range of viewing angles and spatial resolutions.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A directional pixel for use in a display screen is disclosed. The directional pixel receives an input planar lightbeam and scatters a small, controlled fraction of the input planar lightbeam into an output directional lightbeam. The input planar lightbeam propagates in substantially the same plane as the directional pixel, which is designed to be substantially planar. The directional lightbeam has a desired spatial direction and a desired angular spread, thus effectively creating a ray of light that seems to be traversing the plane.

In various embodiments, the directional pixel has a patterned grating of substantially parallel and slanted grooves arranged in or on top of a light propagating layer. The light propagating layer may be, for example, a transparent waveguiding layer made of any transparent material such as, for example, Silicon Nitride ("SiN"), glass or quartz, Indium Tin Oxide ("ITO"), among others. In various embodiments, the light propagating layer may reside on a carrier substrate which can be opaque (e.g. silicon), reflective or transparent (glass). The patterned grating can consist of grooves etched in the light propagating layer or grooves made of material deposited on top of the light propagating layer (e.g., any material that can be deposited and etched or lift-off, including any dielectrics or metal).

As described in more detail herein below, the grating may be specified by a grating length (i.e., dimension along the propagation axis of the input planar lightbeam), a grating width (i.e., dimension across the propagation axis of the input planar lightbeam), a groove orientation, a pitch, and a duty cycle. The directional lightbeam has a direction that is determined by the groove orientation and the grating pitch and an angular spread that is determined by the grating length and width. By using a duty cycle of or around 50%, the second Fourier coefficient of the grating pattern vanishes thereby preventing the scattering of light in additional unwanted directions. This insures that only one directional lightbeam emerges from the directional pixel regardless of the output angle.

It is appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Figure 1:
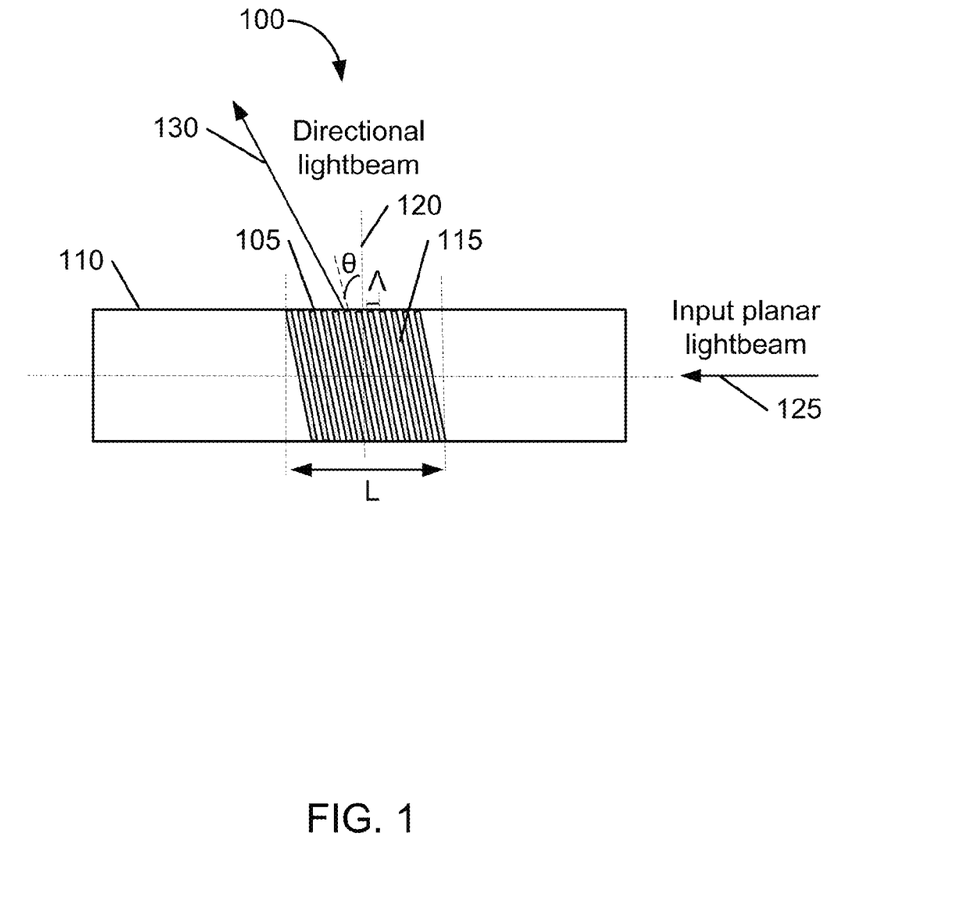
FIG. 1 illustrates a schematic diagram of a directional pixel in accordance with various embodiments.

Referring now to FIG. 1, a schematic diagram of a directional pixel in accordance with various embodiments is described. Directional pixel 100 includes a grating 105 in a light propagating layer 110. Grating 105 includes substantially parallel and slanted grooves 115 with a groove angle θ relative to the axis across the axis of propagation of the input lightbeam. The thickness of the grating grooves 115 can be substantially the same for all grooves resulting in a substantially planar design. When incident light impinges on the directional pixel 100 in the form of an input planar lightbeam 125, the grating 105 scatters a small, controlled fraction of the input planar lightbeam 125 into a directional lightbeam 130.

It is appreciated that this substantially planar design and the formation of directional lightbeam 130 upon an incident planar lightbeam requires a grating with a substantially smaller pitch than traditional diffraction gratings. For example, traditional diffraction gratings scatter light upon illumination with lightbeams that are propagating substantially across the plane of the grating. Here, the grating 105 is substantially on the same plane as the incident planar lightbeam 125 when generating the directional lightbeam 130. This planar design enables illumination with a compact, integrated light source.

The directional lightbeam 130 is precisely controlled by characteristics of the grating 105 including a grating length L, a grating width W, a groove orientation θ, and a grating pitch Λ. In particular, the grating length L controls the angular spread ΔΘ of the directional lightbeam 130 along the input light propagation axis and the grating W controls the angular spread ΔΘ of the directional lightbeam 130 across the input light propagation axis, as follows:

$$\Delta\Theta \approx \frac{4\lambda}{\pi L}\left(\frac{4\lambda}{\pi W}\right) \quad \text{(Eq. 1)}$$

where λ is the wavelength of the directional lightbeam 130. The groove orientation, specified by the grating orientation angle θ, and the grating pitch or period, specified by Λ, control the direction of the directional lightbeam 130 as described in more detail herein below.

The grating length L and the grating width W can vary in size in the range of 0.1 to 200 μm. The groove orientation angle θ and the grating pitch Λ may be set to satisfy a desired direction of the directional lightbeam 130, with, for example, the groove orientation angle θ on the order of −40 to +40 degrees and the grating pitch Λ on the order of 200-700 nm.

Figure 2:
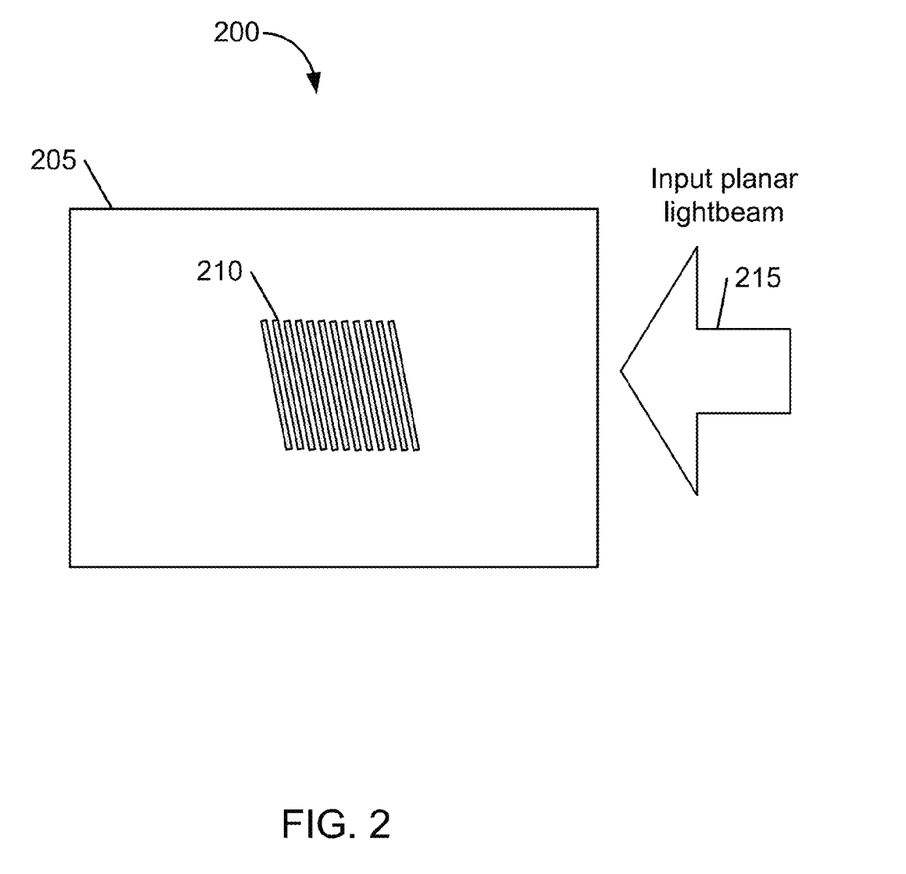
FIG. 2 illustrates a schematic diagram of another directional pixel in accordance with various embodiments.

It is appreciated that the grating width W can be substantially smaller than the width of the light propagating layer. For example, FIG. 2 illustrates a directional pixel 200 having a wide light propagating layer 205 that is much wider than the grating 210 arranged thereon. The light propagating layer 205 can be designed to work with a wide input planar lightbeam (represented by arrow 215) impinging on the surface of the layer 205.

It is also appreciated that the grating width W can be substantially smaller than the grating length L. In this case, the directional lightbeam output by the directional pixel is very narrow in the horizontal direction but broad in the vertical direction. This enables a directional pixel to be designed for use in display screens that only provide horizontal parallax (and not vertical parallax), thereby significantly reducing design and manufacturing complexity for the display screens.

In various embodiments, the directional pixels 100 and 200 can be constructed in various configurations, depending on how the grating grooves (e.g., grating grooves 115) are arranged on the light propagating layer (e.g., layer 105). FIGS. 3A-D illustrate different cross-sections of directional pixel configurations in accordance to various embodiments. The directional pixels illustrated in FIGS. 3A-D have grating grooves that are either etched on a light propagating layer or made of material deposited on top of the light propagating layer (e.g., any material that can be deposited and etched or lift-off, including any dielectrics or metal).

Figure 3A:
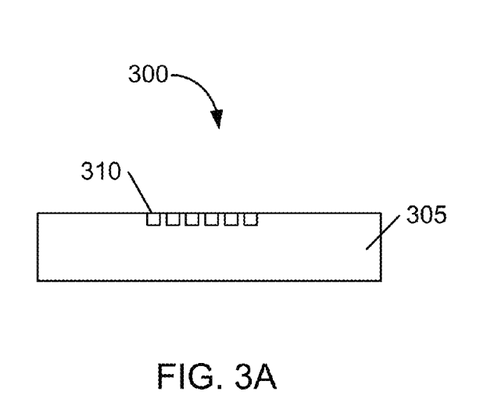
FIGS. 3A-D illustrate different cross-sections of directional pixel configurations in accordance with various embodiments.
Figure 3B:
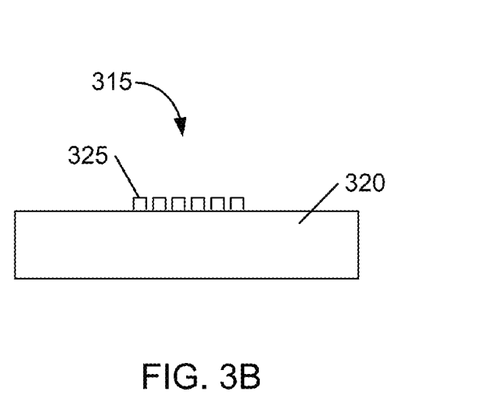
Figure 3C:
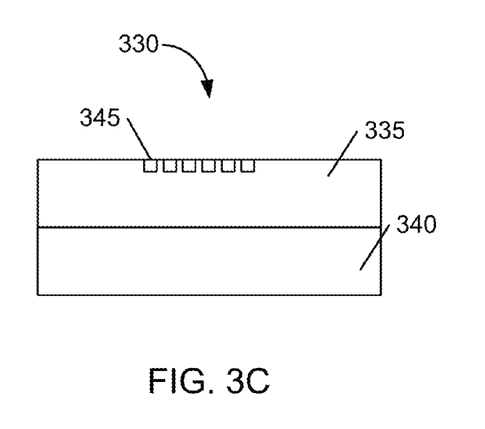
Figure 3D:
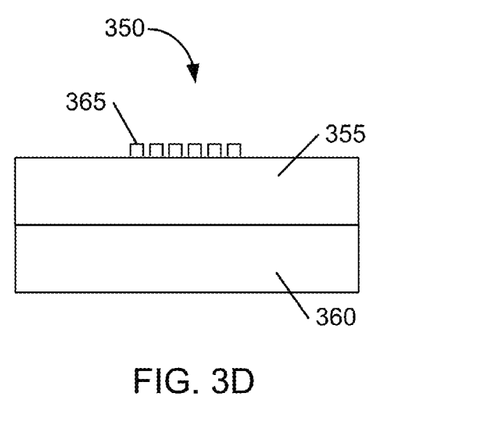

For example, directional pixel 300 in FIG. 3A includes a light propagating layer 305 with a grating 310 etched thereon. Directional pixel 315 in FIG. 3B includes a light propagating layer 320 with a grating 325 deposited on top (e.g. with a dielectric or metal deposit by a lift-off process). Directional pixel 330 in FIG. 3C includes a light propagating layer 335 arranged on a substrate 340. A grating 345 is etched on the light propagating layer 335. And directional pixel 350 in FIG. 3D includes a light propagating layer 355 arranged on a substrate 360. A grating 365 is deposited on top of the light propagating layer 355.

One skilled in the art appreciates that the directional pixels 300, 315, 330, and 350 respectively illustrated on FIGS. 3A-D are but example configurations that may be fabricated with various fabrication techniques such as optical lithography, nano-imprint lithography, roll-to-roll imprint lithography, direct embossing with an imprint mold, among others. It is also appreciated that the substrate layers 340 and 360 illustrated in FIGS. 3C-D may include one or more substrate layers. Further, it is appreciated that the substrate layers 340 and 360 may be transparent, reflective, or opaque.

Figure 4:
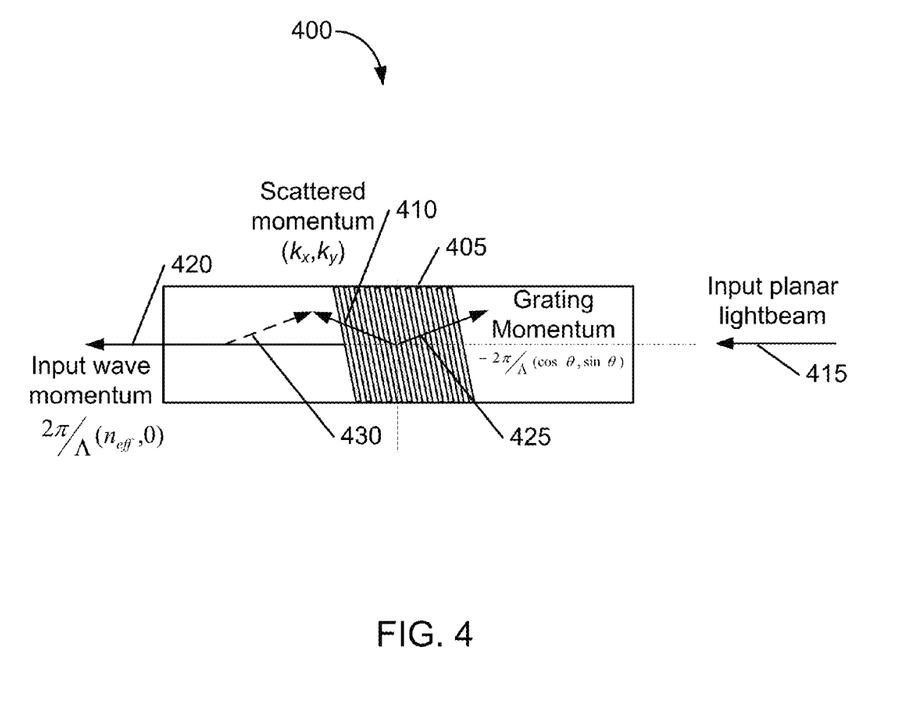
FIG. 4 illustrates a schematic diagram showing properties of the grating of FIGS. 1-2 in more detail.

Attention is now directed to FIG. 4, which illustrates properties of the gratings of FIGS. 1-2 in more detail. Grating 405 in directional pixel 400 has a geometry that dictates the direction and angular spread of an output directional lightbeam 410 upon the incidence of an input planar lightbeam 415. The relationship between the geometry of the grating 405 and the direction of the directional lightbeam 410 can be determined by using principles of momentum conservation. Specifically, the sum of the input wave momentum $K_i$, measured in terms of an effective index $n_{eff}$ of propagation in the planar lightbeam 415 (represented by arrow 420) and (a multiple of) the grating momentum $K_g$ (represented by arrows 425 & 430) must equal the momentum of the output directional lightbeam 410 $K_o$:

$$K_o = K_i + K_g \quad \text{(Eq. 2)}$$

where $K_i$, $K_g$, and $K_o$ are momentum vectors.

The momentum of the planar waveguide $K_i$ can be given by the following vector:

$$K_i = \frac{2\pi}{\lambda}(n_{eff}, 0) \quad \text{(Eq. 3)}$$

where $n_{eff}$ is the effective refractive index of the grating 405. Note that the momentum in the vertical direction is equal to zero as the planar lightbeam 415 propagates in the horizontal plane. The momentum kick provided by the grating 405 $K_g$ is given by:

$$K_g = -\frac{2\pi}{\Lambda}(\cos\theta, \sin\theta) \quad \text{(Eq. 4)}$$

This results in the momentum of the output directional lightbeam 410 $K_o$ being given by:

$$\left(\frac{\lambda}{2\pi}\right)k_x = n_{eff} - \frac{\lambda}{\Lambda}\cos\theta \quad \text{(Eq. 5)}$$

$$\left(\frac{\lambda}{2\pi}\right)k_y = -\frac{\lambda}{\Lambda}\sin\theta \quad \text{(Eq. 6)}$$

where $k_x$ and $k_y$ are the horizontal and vertical components of the momentum vector $K_o$, i.e., $K_o = (k_x, k_y)$. Equations 5 and 6 demonstrate that the direction of the directional lightbeam 410 is a function of the grating orientation and the grating pitch, as described above.

Figure 5:
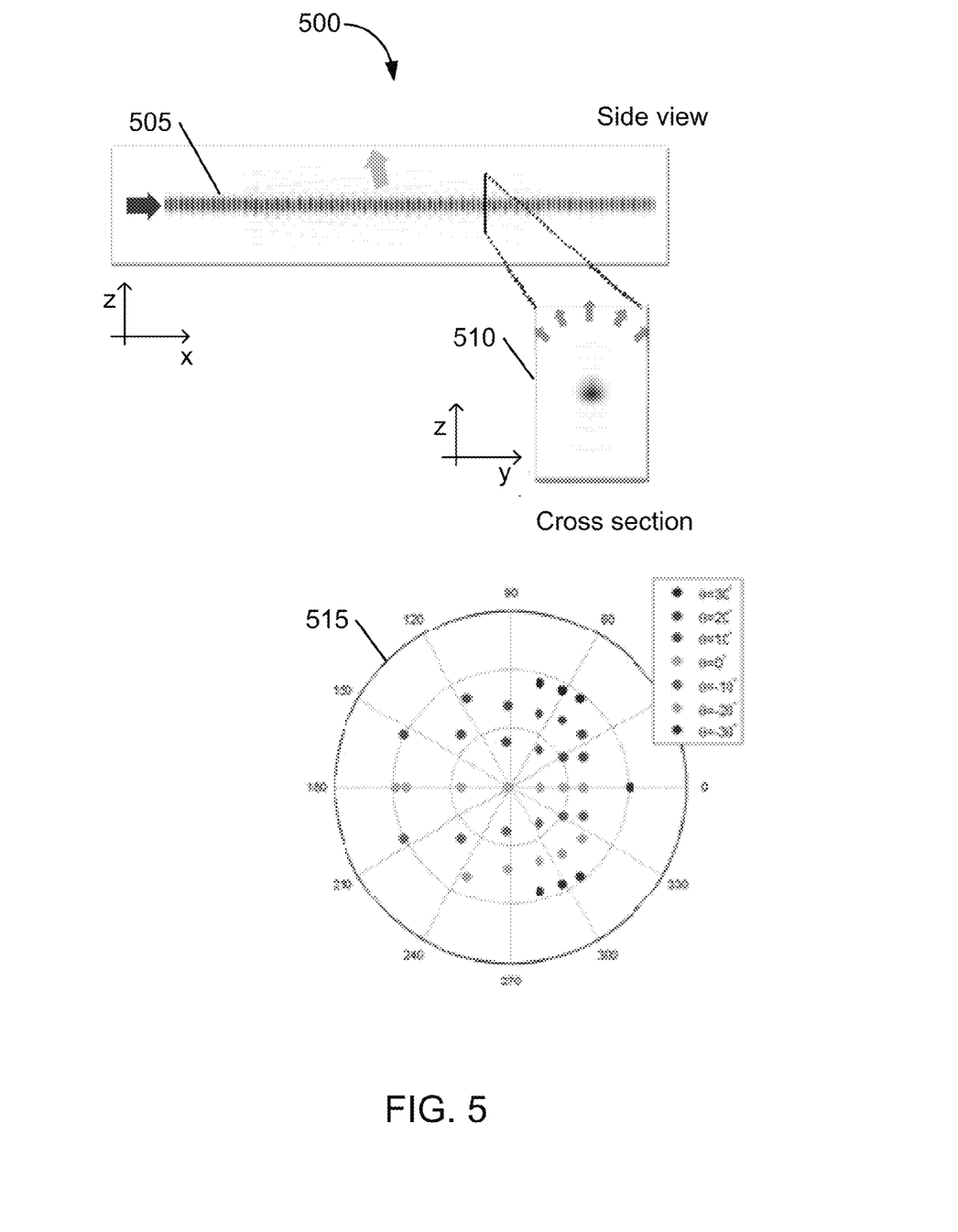
FIG. 5 illustrates a schematic diagram showing results of a FDTD simulation on a grating in accordance with various embodiments.

The above equations for scattering angle can be simulated using a full 3D Finite Difference Time Domain Calculation ("FDTD") running on a computing cluster. Referring now to FIG. 5, a schematic diagram showing results of a FDTD simulation on a grating in accordance with various embodiments is described. Grating 505 in directional pixel 500 produces a directional lightbeam 510 when illuminated with an incident planar lightbeam. A FDTD simulation and a calculation of the scattering angle of the directional lightbeam 510 shows the precise control that can be achieved to produce a directional lightbeam 510 as a function of the geometry of the grating 505. The 50% duty cycle of the grating insures that only one directional lightbeam emerges from the pixel regardless of the output angle.

Advantageously, this precise control enables a directional pixel to direct light to any desired viewpoint, with an easy to fabricate substantially planar structure. The directional pixel may be used in multi-view display screens to emulate a light field, with multiple directional pixels providing multiple views. In addition, the directional pixel may be used in other applications, such as, for example, in a privacy display screen to provide a secure and private viewing to a viewer (e.g., by having the viewer positioned to see the directional lightbeams output by the directional pixels in the display screen).

Figure 6:
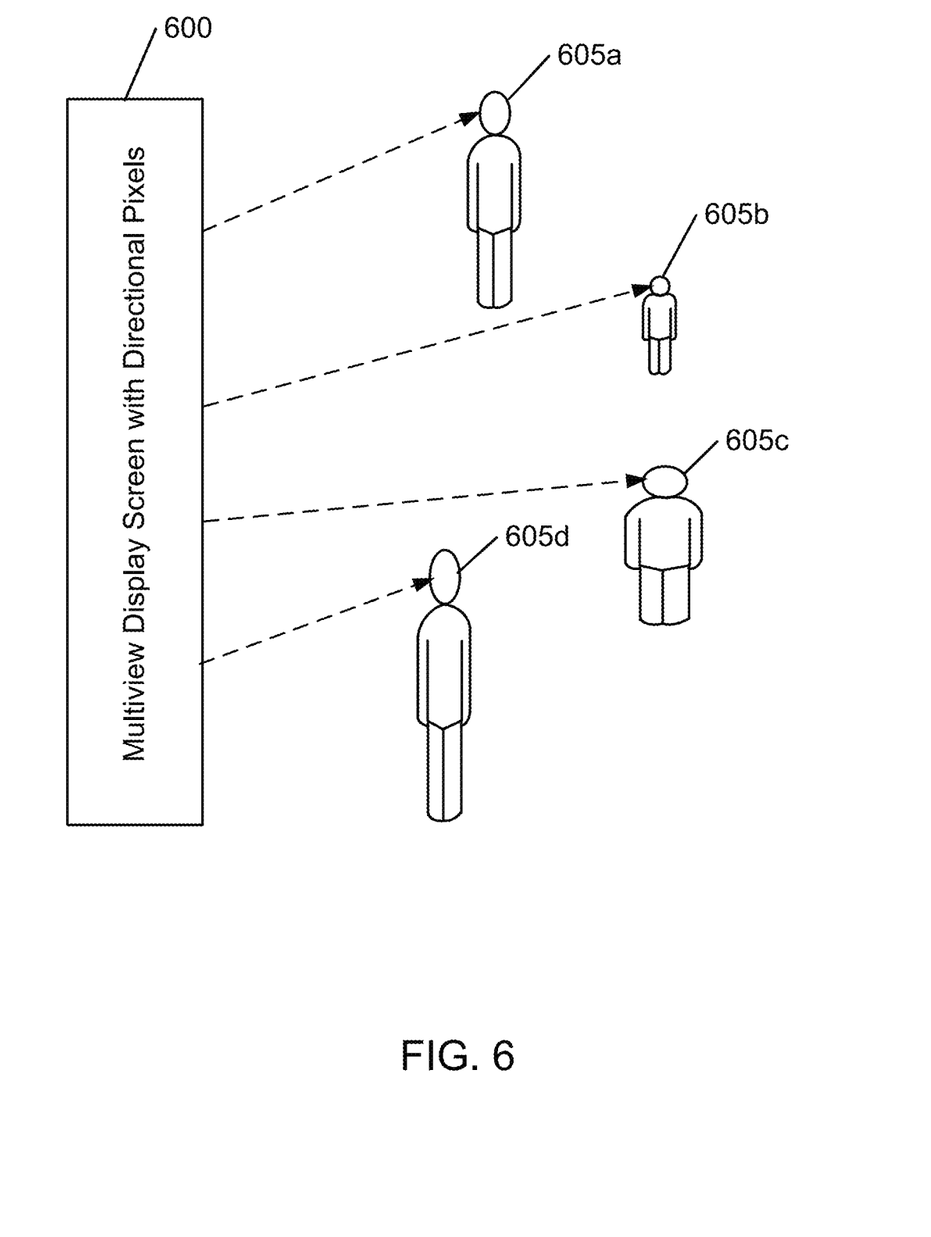
FIG. 6 illustrates an example of a multi-view display screen with directional pixels built in accordance with various embodiments.

An example of a multi-view display screen with directional pixels built in accordance with various embodiments is illustrated in FIG. 6. Display screen 600 is a multi-view display screen having directional pixels (not shown) to provide multiple views to viewers (e.g., viewers 605*a-d*.) Each directional pixel generates a directional lightbeam that can be used to form a view. Combining multiple directional pixels in display screen 600 enables multiple directional lightbeams to be generated, thereby emulating a light field and giving viewers 605*a-d* the ability to perceive natural, real-world scenes as they would experience in person.

Figure 7:
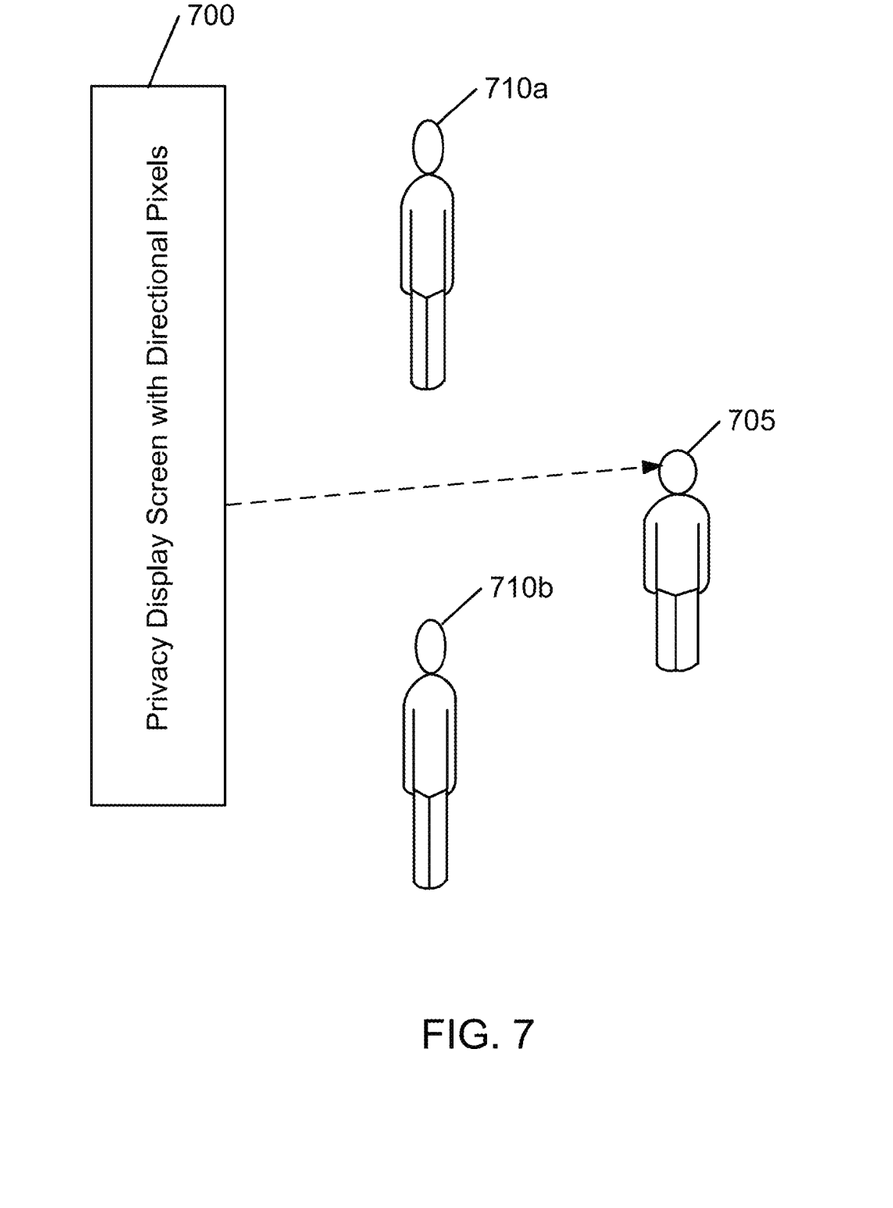
FIG. 7 illustrates an example of a privacy display screen with directional pixels built in accordance with various embodiments.

An example of a privacy display screen with directional pixels built in accordance with various embodiments is illustrated in FIG. 7. Privacy display screen 700 is a display screen having directional pixels (not shown) to provide a private, secure view of the content displayed in the screen 700 to a viewer, e.g., viewer 705. In this case, the directional pixels in the privacy display screen 700 provide a limited view zone that is only viewable by viewer 705. Viewers 710*a-b* are outside of the view zone and are therefore not able to view the content in the display screen 700.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A directional pixel for use in a display screen, the directional pixel to receive a planar lightbeam and comprising:
   a light propagating layer to propagate the planar lightbeam; and
   a grating in the light propagating layer to scatter a portion of the planar lightbeam out of the light propagating layer as a directional lightbeam having a direction and an angular spread controlled by the grating,
   wherein the grating in the light propagating layer is one or both of in a surface of the light propagating layer and in a material on the propagating layer surface.

2. The directional pixel of claim 1, wherein the light propagating layer comprises a transparent Silicon-Nitride ("SiN") layer.

3. The directional pixel of claim 1, wherein the grating has a duty cycle around 50%.

4. The directional pixel of claim 1, wherein the grating comprises a plurality of substantially parallel and slanted grooves, the grating having a grating period, a grating orientation, a grating length and a grating width.

5. The directional pixel of claim 4, wherein the grating period and the grating orientation are configured to control the direction of the directional lightbeam.

6. The directional pixel of claim 4, wherein the grating length and the grating width are configured to control the angular spread of the directional lightbeam.

7. The directional pixel of claim 1, wherein the directional pixel is substantially planar, a front surface and a back surface of the light propagating layer being substantially parallel to one another.

8. The directional pixel of claim 1, wherein the display screen is a multi-view display screen, the directional lightbeam having a direction corresponding to a view direction of the multi-view display screen.

9. The directional pixel of claim 1, wherein the display screen is a privacy display screen.

10. The directional pixel of claim 4, wherein the grating width is substantially smaller than the grating length and the display screen is a horizontal parallax only display screen.

11. A grating for use in a directional pixel in a display screen, the grating being configured to scatter an incident planar lightbeam into a directional lightbeam, the grating comprising a plurality of substantially parallel and slanted grooves having a period, an orientation, a length, and a width, the period and the orientation being configured to control a direction of the directional lightbeam, the length and the width being configured to control an angular spread of the directional lightbeam, wherein the grating is in a light propagating layer configured to guide the incident planar lightbeam.

12. The grating of claim 11, wherein the grating is in a surface of the light propagating layer.

13. The grating of claim 11, wherein the grating is in a material on a surface of the light propagating layer.

14. The grating of claim 11, wherein the direction of the directional lightbeam is a function of the grating period, the grating orientation, a wavelength of the directional lightbeam, and an effective refractive index of the grating.

15. The grating of claim 11, wherein the angular spread of the directional lightbeam is a function of the grating length, the grating width, and a wavelength of the directional lightbeam.

16. The grating of claim 11, wherein the display screen is a multi-view display screen, the directional lightbeam having a direction corresponding to a view direction of a direction pixel of the multi-view display screen.

17. The grating of claim 11, wherein the display screen is a privacy display screen.

18. The grating of claim 11, wherein the grating width is substantially smaller than the grating length and the display screen is a horizontal parallax only display screen.

19. A directional pixel for use in a display screen, comprising:
   a light propagating layer arranged on a substrate layer to carry a planar lightbeam; and
   a grating arranged in the light propagating layer to scatter the planar lightbeam into a directional lightbeam having a direction and an angular spread controlled by the grating.

20. The directional pixel of claim 19, wherein the grating is in a surface of the light propagating layer.

21. The directional pixel of claim 19, wherein the grating is in a material at a surface of the light propagating layer.

22. The directional pixel of claim 19, wherein the display screen is a multi-view display screen.

23. The directional pixel of claim 19, wherein the display screen is a privacy display screen.

* * * * *